April 15, 1969 J. M. BOOE 3,439,231

HERMETICALLY ENCAPSULATED ELECTRONIC DEVICE

Filed Feb. 13, 1967

INVENTOR
JAMES M. BOOE
BY
ATTORNEY

United States Patent Office 3,439,231

Patented Apr. 15, 1969

3,439,231

HERMETICALLY ENCAPSULATED ELECTRONIC DEVICE

James M. Booe, Indianapolis, Ind., assignor to P. R. Mallory & Co., Inc., Indianapolis, Ind., a corporation of Delaware Filed Feb. 13, 1967, Ser. No. 615,485

Int. Cl. H01g *1/02, 9/10*

U.S. Cl. 317—230 12 Claims

ABSTRACT OF THE DISCLOSURE

The present invention relates generally to encapsulants for electronic components, and more particularly, to hermetic encapsulating means for resistors, integrated circuits, electrostatic and electrolytic capacitors, thin film circuits, ceramic circuits, coils, batteries, combinations thereof, and the like including an inner plastic sheath and bonded layers of alloyed or unalloyed metals. The layers of metal include an inner layer and an outer layer that are atomically bonded by fusion. The fused metal layer will "wet" and fill any holes in the inner metal layer and bridge any small gap or gaps between the inner layer and the terminal insulators thereby providing a hermetic enclosure.

It is known, in order to be operational for their intended purpose, certain types of electronic devices must be hermetically sealed. Perhaps, the best known of the aforementioned types of electronic devices is the vacuum tube. Other types of electronic components such as semiconductors, capacitors, batteries, resistors, thin film circuits, integrated circuits, ceramic circuits and the like function acceptably without requiring encapsulation within an hermetic housing. However, it is known that the aforementioned electronic components have more stable operating characteristics and have greatly increased operational life when hermetically encapsulated. Hermetic sealing of electronic components or elements prevents elements such as moisture, oxygen and the like present in the normal ambient environment in which the electronic devices generally operate from attacking and chemically reacting with the various constituents of the electronic device. Another tangible benefit realized from an hermetic encapsulant is the protection from abusive handling afforded to the constituents of the electronic device.

By way of example, a conventional hermetic encapsulant for a tantalum electrolytic capacitor of the solid electrolyte type is generally provided by first applying a suitable metallic cathodic coating over the tantalum anode, placing the tantalum into a suitable metal can containing a droplet of solder therein, heating the can to provide a mechanical and an electric bond between the can and the cathodic material on the tantalum anode, and then soldering, welding or the like a glass-to-metal seal to close and hermetically seal the open end of the can. One disadvantage of the above structure is that the encapsulant is large and bulky. Another disadvantage of the above method is that the method necessitates an unusually large number of handling and/or transfer steps which increase the chance that the capacitor will be inadvertently damaged during manufacture. It is known that a reduction in the handling and/or transfer steps required to fabricate a capacitor will result in a lesser number of the capacitor units being rejected as scrap. A similar correlation exists for other electronic devices such as semiconductors, resistors, integrated circuits, batteries, thin film circuits, ceramic circuits, coils for transformers, and combinations of any of these, and the like.

Still another disadvantage with the conventional hermetic encapsulant is the difficulty of eliminating moisture and oxygen from the container when the final closure is made. These and other agents which may be present in the air are highly detrimental to some devices.

In addition, considering electronic microcomponents, the physical dimensions of the conventional hermetic enclosure may be as great and in certain instances several times greater than the physical dimensions of the microcomponent element desired to be encapsulated. It is seen that the overall physical dimensions and the weight of the completed device is greatly increased over that of the actual element, thereby seriously undermining the intent and purpose of microminiaturization, that is, its small size and light weight.

The conventional hermetic enclosure outlined above is not commensurate with low cost and the retention of small physical dimensions and light weight of the electronic device. There are several examples where the cost of the electronic device is much greater when the above conventional type of hermetic enclosure is used.

Therefore, it is an object of the present invention to provide an hermetic enclosure for an electronic element having a plastic sheath surrounded by an inner metal layer and an outer metal layer which "wets" and fills any holes in the inner metal layer thereby providing an hermetic enclosure.

A further object of the present invention is to provide an hermetic enclosure including a non-fusible inner layer and a fusible outer layer which becomes atomically bonded to the inner layer during fusion thereby providing an hermetic enclosure in which the porosity of the combined metal layers is eliminated.

Another object of the present invention is to provide an hermetic enclosure including a plurality of atomically bonded layers having an interdiffusion interface therebetween.

A further object of the present invention is to provide an hermetic enclosure for an electronic element, which provides a no larger than necessary hermetic enclosure and which eliminates several of the handling steps commonly associated with electronic devices hermetically sealed using conventional procedures.

Another object of the present invention is to provide an hermetic enclosure for an electronic element including plastic sheath means substantially surrounding the electronic device and atomically bonded layers of metal bonded to the plastic sheath.

Yet another object of the present invention is to provide an hermetic enclosure of an electronic element including a plurality of metallic layers located over a plastic sheath substantially surrounding the electronic device so as to provide said hermetic enclosure for said electronic device.

Still another object of the present invention is to provide an hermetic enclosure for an electrolytic capacitor which does away with the need for a metal can and solder connections thereby reducing the number of handling operations required during fabrication of the capacitor.

Another object of the present invention is to provide an hermetic enclosure for an electronic element including a sheath of plastic substantially surrounding the device, hermetic end seal means surrounding the terminals or leads projecting from the electronic device and a plurality of metallic layers plated over the sheath and having a margin embracing the insulating means so as to form an hermetic seal therebetween and to fixedly retain the insulating means in a predetermined position with regard to the electronic element.

Yet another object of the present invention is to provide an hermetic enclosure for an electronic element which is simple in construction, reliable, economical to manufacture and lightweight.

A further object of the present invention is to provide an hermetic enclosure for an electronic element having an inner metallic layer selected from a group consisting of the moderately high melting point temperature metals and alloys and an outer layer selected from a group consisting of soft-solder compositions having relatively low melting point temperatures, the outer layer atomically bonded to the inner layer by fusion.

The present invention, in another of its aspects, relates to the novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description, appended claims and appended drawings. The invention resides in the novel construction, combination, arrangement and cooperation of elements as hereinafter described and more particularly as defined in the appended claims.

The appended drawings illustrate an embodiment of the present invention constructed to function in the most advantageous modes devised for the practical application fo the basic principles involved in the hereinafter described invention.

Generally speaking, the present invention provides an hermetically sealed electrical element. The electrical element has spaced terminal leads. Insulating means including an insulative body and a metallized ring integrally formed therewith is disposed on the electrical element. The insulative body of the insulating means is joined to the terminal leads in an hermetic joint. A plastic sheath substantially surrounds the electrical element. An inner non-fusible metal layer is disposed on the plastic sheath and has a margin embracing the metallized ring of the insulative member. An outer fusible metal layer is disposed on the inner non-fusible metal layer and has a margin embracing the metallized ring of the insulative member. The outer fusible metal layer "wets" the innner non-fusible metal layer thereby filling any holes in the inner non-fusible metal layer and bridges gaps between the inner non-fusible metal layer and the metallized ring thereby providing an hermetically sealed enclosure.

Figure 1:
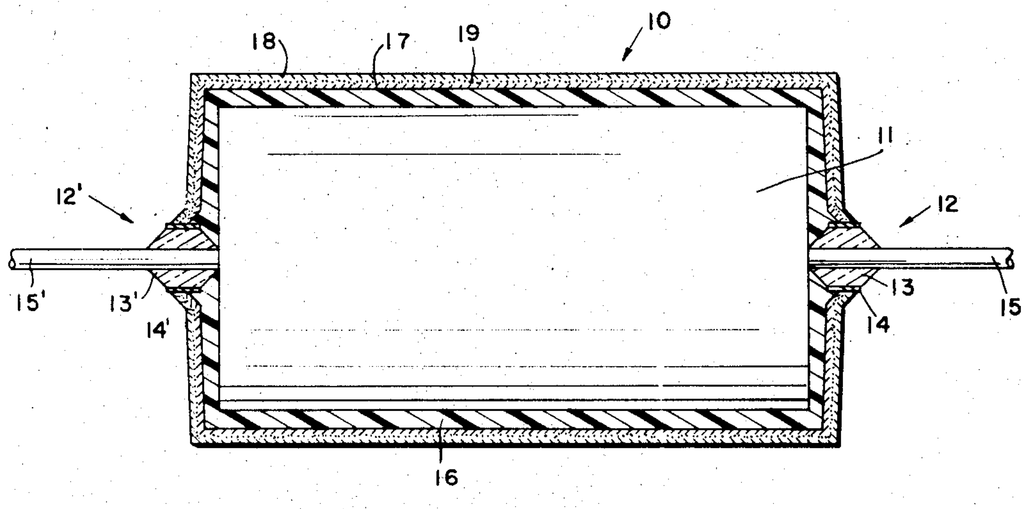
FIGURE 1 is a cross sectional view of an axial lead, hermetically sealed electronic device illustrating the plastic sheath, end seals and metallic layers atomically bonded by fusion.

Referring now to the exploded view illustrated in FIGURE 1 of the drawing, the hermetically sealed electronic component or element is indicated by the numeral 10. The body of an electronic element is illustrated by the numeral 11. The electronic device may be any of either a capacitor, a semiconductor, a resistor, an integrated circuit, a battery, a coil, a thin film circuit, ceramic circuit, combinations thereof, and the like. Assuming that the electronic device is an axial lead, electrolytic tantalum capacitor, the body will comprise a porous tantalum anode having a dielectric film, a semiconductive layer such as $MnO_2$ overlying the dielectric layer, and an anode riser (not shown) connected to axial lead 15. Glass-to-metal or ceramic-to-metal insulating members 12 and 12' including respectively a glass body or a ceramic body 13 and 13' which are respectively surrounded by and hermetically bonded to a solderable metal band or ring 14 and 14' so as to afford an efficient and effective hermetic seal around the axial leads 15 and 15'.

FIGURE 1 shows that one end of the glass body or the ceramic body abuts the electronic device 11. The ends of the insulating members may be, for example, frustum conical-shaped as shown in the drawing. It is preferable that the glass or ceramic portion of the insulating members have a cylindrical periphery so as to be better able to receive the surrounding metallic ring 14. The metallic ring may be fabricated around the periphery of the glass or the ceramic body as shown in FIGURE 1 by using a silver powder-glass frit composition suspended in a suitable organic vehicle so as to form a "paint" and applying the "paint" in any of several conventional ways to the periphery glass or ceramic portion of the end seal after the glass or ceramic has been placed around the axial lead. The insulating members are heated to a suitable temperature and cooled, thereby forming an hermetic seal around each lead. The seal includes around the periphery thereof, as shown in FIGURE 1, a solderable ring of metal. This band may also be fabricated from wrought metal and bonded to the glass member when same is bonded to the lead as described above. This method is commonly used in glass-to-metal seal technology. Still another applicable approach is to employ a glass or ceramic member having a hole or a plurality of holes for the lead wire or wires, the hole or holes as well as the outer periphery are metallized to provide for convenient soldering of the lead or leads thereto.

After the glass-to-metal or ceramic-to-metal insulating members or end seals are seated and connected to the leads so as to form an hermetic seal therearound, a coating of a suitable organic plastic material of a thermosetting plastic resin or a thermoplastic resin is applied over the electronic device. The coating takes the form of plastic sheath 16, which substantially surrounds the electronic device. The plastic sheath may be applied to the electronic device using any one of several techniques such as injection molding or by dip coating the electronic device or element assuming the organic plastic contains a suitable solvent. If the plastic contains a solvent, the solvent is subsequently removed by baking at the appropriate elevated temperature to completely remove same. Thermosetting plastic resins such as epoxy, phenolic, certain silicone compositions and the like which do not include a solvent may be used to form a sheath around the electronic device. Other methods of applying the plastic sheath to the electronic device may be used such as, for example, spraying, a fluidized bed process and the like. It has been found that the plastic sheath must terminate at the metallic ring of the end seal so as to leave at least a portion of the metallic ring substantially free of the plastic sheath so that the subsequent layers of metal will embrace the metallic ring in an hermetically sealed joint. The mold used to form the plastic sheath around the electronic device may be so formed to assure that desired portions of the metal ring are not covered by the plastic sheath. If a dipping process or a spraying process is used to apply the organic plastic to the electronic device, the metal ring of the end seal may be protected by a mask which substantially prevents the organic plastic from being deposited on the end seal where masked.

An inner metal layer 17 is deposited over the plastic sheath 16 by any suitable method such as chemical and electrochemical deposition, vacuum vapor deposition, vapor plating and the like. If the plastic sheath is acrylonitrilebutadiene-styrene, polysulfone, polypropylene or the like it may have the surfaces sensitized so that direct deposition of the inner metal layer onto the plastic sheath can be accomplished by chemical and electrochemical methods. The inner metal layer will form a bond with the plastic sheath. Bond strength of 5 to 25 pounds per square inch have been achieved and the metallized plastic sheath will withstand thermal cycling over a broad range of temperatures without adversely affecting the bond between the plastic sheath and the inner metal layer.

The inner metal layer 17 is a metal selected from a group of metals which have the following characteristics: a moderately high melting point temperature; can be readily applied by one or more of vacuum vapor deposition, chemical and electrodeposition; and vapor plating; and are readily solderable with soft solder compositions. Several of the metals having the above characteristics are: the Group VIII–A metals, iron, nickel, cobalt, and alloys thereof and the Group I–B and Group II–B metals, silver, copper, gold and zinc and alloys thereof. Aluminum may also be used if the aluminum undergoes a special surface treatment which renders the surface thereof readily solderable. The thickness of layer 17 is greatly exaggerated in order to properly illustrate the present invention. The inner layer is about .1 mil to about 10 mils thick. One purpose of the inner metal layer is to provide the plastic sheath with sufficient surface strength to withstand subsequent normal and abusive handling. Another purpose is to retain the outer layer in a uniform film when same is fused.

By definition an hermetic seal is accomplished by fusion-bonding or metal and/or glass. It was found that the inner metal layer does not provide a true hermetic seal when deposited in a thin layer. The inner metal layer is thin if deposited in accordance with the teachings of the present invention and, therefore, is porous. In addition, the junction between the inner metal layer 17 and the metal closure 14 may not be an hermetic bond.

In order to hermetically seal the electronic device, an outer metal layer 18 is applied over the inner metal layer 17 by any acceptable method such as by dipping the device in a molten bath of the material and the like. The outer metal layer may also be applied by electrodeposition, or vacuum deposition and subsequently fused by one of several methods. It will be recognized by those skilled in the art that to facilitate quick and complete wetting and bonding of the outer layer to the inner layer when the outer layer is fused, a flux such as rosin may be advantageously employed. The outer metal layer is about .05 to 2 mils thick. As with the thickness of the inner metal layer, the thickness of metal layer 18, as shown in the drawing, is greatly exaggerated in order to properly illustrate the invention.

The outer layer may be a metal or metal alloy selected from a group of soft-solder metals having low melting point temperatures. The metal or metal alloy selected to be used as the outer layer is chosen in light of two factors, i.e., the melting point temperature of the outer layer metal or the alloy must be below the temperature at which the plastic sheath begins to soften and above the operating temperature of the electronic device.

Several of the metals applicable for compositions of the outer layer are: lead, bismuth, tin, cadmium and indium. Several of the alloys having the above characteristics are: tin-lead, tin-cadmium, bismuth-cadmium, tin-bismuth, bismuth-lead, tin-indium, tin-bismuth-cadmium, and bismuth-lead-cadmium and the like alloys.

The following examples are illustrations of the temperature factor which limits the selection of the outer metal layer. Assuming an electronic device which is to operate at about 85° C. and an acrylonitrile-butadiene-styrene resin forming the plastic sheath which has a softening temperature of about 125° C., located around the device as shown in the drawing, the outer metal layer is selected so as to have a melting point temperature between 85° C. and 125° C. Polypropylene has a softening temperature of about 125° C., therefore, it may be substituted for acrylonitrile-butadiene-styrene resin. If the electronic device is to have an operating temperature of about 125° C., then the plastic sheath must have a softening point temperature above 125° C. A polysulfone sheath may be used since it has a softening point temperature of about 175° C. The outer metal layer metal must be selected so as to have a melting point temperature of between 125° C. and 175° C. so that when the outer layer metal is applied over the inner metal layer in the molten state, the plastic sheath is not softened which may detrimentally affect the electronic device.

An atomic bond is present between the inner metal layer and the outer metal layer and between the metal ring and the outer metal layer due to the application of the outer metal layer over the inner metal layer while in a molten condition.

The inner and the outer metal layers, atomically bonded by fusion, are used to eliminate the porosity of the resulting composite layers yet retain overall thinness and to improve other metallurgical properties of the individual metals. The atomic bond layer formed by fusion is characterized by the formation of an interdiffusion zone and/or intermetallic compound, as shown at 19 in FIGURE 1, having distinct advantages over simple plating of one metal layer over another metal layer, i.e., the fused metal or alloy "wets" and fills any holes in the inner metal layer and "wets" the metallized areas of the terminal insulators and bridges any small gaps between the inner layer and the metallized areas thereby providing an hermetic enclosure.

Batch processing of the electronic device is preferred because of the greater degree of control feasible with regard to the features of the process. Generally, after the hermetic insulating members 12 and 12' are attached to the leads 15 and 15' of the electronic device 10 as shown in the drawing, the end seals are protected by masks and the electronic device including the end seals are dipped in a suitable organic plastic material to coat the electronic device with a plastic sheath as shown in the drawing. The organic plastic sheath is dried at room temperature or at a suitable elevated temperature and the masks removed. The electronic device to be coated with the inner metallic layer is placed within a vacuum coating chamber having a pressure within the chamber of about $10^{-5}$ torr. The copper metal element to be vacuum deposited onto the plastic sheath is heated to about 2400° F. These conditions cause the copper to vaporize thus reducing the pressure to about $10^{-2}$ torr. Deposition of copper metal is continued for about 1 hour during which period of time a film or layer of copper metal having a thickness of about 1 mil is deposited over the plastic sheath. When the plastic sheath is metallized, the inner metal layer will form a bond therewith. The coated electronic device is removed and fluxed and dipped into a molten metal or alloy having a melting point temperature above the operating temperature of the electronic device but below the softening temperature of the plastic sheath. An eutectic tin-bismuth-cadmium alloy has a melting point temperature of about 103° C. which is above the 85° C. normal operating temperature of most electronic devices yet below the 125° C. softening temperature of acrylonitrile-butadiene-styrene. The thickness of the outer metal layer is about 1 mil and is atomically bonded by fusion to the inner metal layer. It was found that the fused alloy "wetted" and filled the holes in the inner metal layer and "wetted" the metallized area of the terminal insulators and bridged any small gaps between the inner layer and the metallized area of the terminal insulators.

Figure 2:
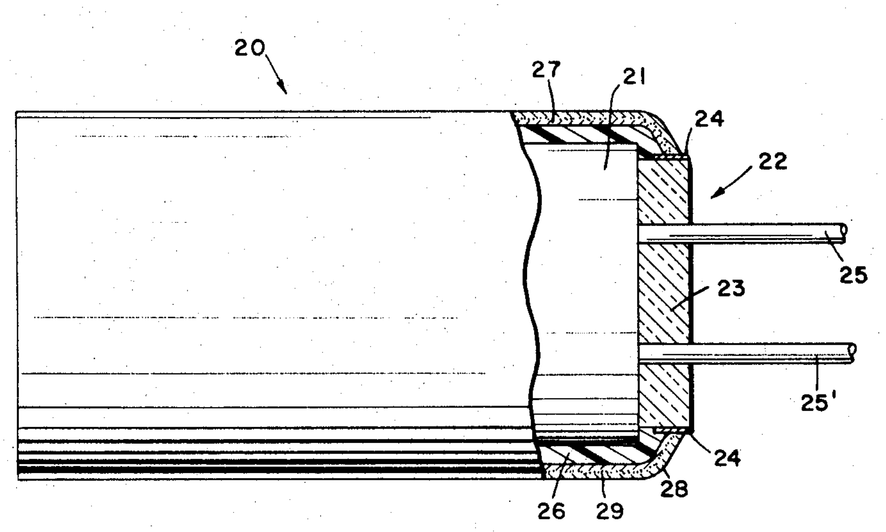
FIGURE 2 is a cross sectional view of a two terminal hermetically sealed electronic device illustrating the plastic sheath, end seal and metallic layers atomically bonded by fusion.

FIGURE 2 of the drawing shows an hermetically sealed electronic device 20. The electronic device is illustrated at 21. The terminal leads 25 and 25' project from the same extremity of the electronic device as shown in FIGURE 2. The terminal leads are hermetically sealed therearound by hermetic end seal 22 including a glass or ceramic body 23 having the periphery thereof surrounded by a metal closure 24 as shown in FIGURE 2. An organic plastic sheath is located over the electronic device. The inner metal layer 27 is a vacuum vapor deposited or electrodeposited onto the plastic sheath. A molten outer metallic layer 28 is deposited over the inner metal layer 27 by a dipping step. As shown in FIGURE 2 and disclosed hereinbefore, an atomic bond exists between the two layers as shown at 29.

The inner metal layer can be applied to the plastic sheath by chemical and electrochemical plating. Assuming a plastic sheath or acrylonitrile-butadiene-styrene resin, or polypropylene, polysulfone and other resins capable of being electroplated, the plastic sheath is sensitized by electroless plating of a very thin deposit of a metal such as, for example, copper which renders the surfaces of the sheath conductive. The surfaces of the sheath are thus conductively primed by the electroless deposition of the copper. The electronic device with its conductively primed sheath is immersed in an electroplating bath of, for example, bright acid copper having a temperature of about 70° F. and a copper anode. A voltage is applied between the anode and the primed sheath so that an operating current density of about 60 amperes per square foot existed. Pure copper having a thickness of about 1 mil is deposited on the primed sheath after about 20 minutes. The electronic device is removed from the plating bath and immersed in a rosin alcohol solution so as to flux the surfaces of the plated copper. An outer metallic layer was deposited over the inner metal layer by dipping the electronic device in a molten soft-solder bath.

The present invention is not invented to be limited to the disclosure herein, and changes and modifications may be made in the disclosure by those skilled in the art without departing from the spirit and the scope of the novel concepts of this invention. Such modifications and variations are considered to be within the purview and scope of this invention and the appended claims.

Having thus described my invention, I claim:

1. An hermetically sealed electrical device comprising an electrical element having spaced terminal leads, insulating means including an insulative body and a metallized ring integrally formed therewith disposed on said electrical element, said insulative body of said insulating means joined to said terminal leads in an hermetic joint, a plastic sheath substantially surrounding said electrical device, an inner non-fusible metal layer disposed on said plastic sheath and having a margin embracing said metallized ring of said insulative body, an outer fusible metal layer disposed on said inner non-fusible metal layer and having a margin embracing said metallized ring of said insulative body, said outer fusible metal layer having wetted said inner non-fusible metal layer thereby substantially filling any holes in said inner non-fusible metal layer and having bridged gaps between said inner non-fusible metal layer and said metallized ring thereby providing an hermetically sealed enclosure.

2. An hermetically sealed electrical device as claimed in claim 1, wherein said inner metal layer and said outer metal layer are atomically bonded by fusion.

3. An hermetically sealed electrical device as claimed in claim 1, wherein said inner metal layer is selected from the group consisting of Group I–B, Group II–B and Group VIII–A metals and alloys thereof and said outer layer is selected from the group consisting of the soft-solder metals and alloys thereof.

4. An hermetically sealed electrical device as claimed in claim 3, wherein said Group I–B metals are gold, silver and copper, said Group II–B metal is zinc, and said Group VIII–A metals are iron, nickel and cobalt.

5. An hermetically sealed electrical device as claimed in claim 3, wherein said soft-solder metals are alloys of lead, bismuth, tin, cadmium and indium.

6. An hermetically sealed electrical device as claimed in claim 1, wherein said inner metallic layer has a thickness of about 0.1 to 10 mils.

7. An hermetically sealed electrical device as claimed in claim 1, wherein said outer metallic layer has a thickness of about 0.05 to 2 mils.

8. An hermetically sealed electrical device as claimed in claim 1, wherein said plastic sheath is an organic plastic sheath.

9. An hermetically sealed electrical device as claimed in claim 8, wherein said organic plastic sheath is selected from the group consisting of thermosetting plastic resins and thermoplastic resins.

10. An hermetically sealed electrical device as claimed in claim 8, wherein said organic plastic sheath is selected from the group consisting of urea-formaldehyde resin, acrylonitrile-butadiene-styrene, polypropylene, and polysulfone.

11. An hermetically sealed electrical device as claimed in claim 1, wherein said inner metal layer is bonded to said plastic sheath.

12. An hermetically sealed electrical device comprising an electrical element having spaced terminal leads, insulating means including an insulative body and a metallized ring integrally formed therewith disposed on said electrical element, said insulative body of said insulating means joined to said terminal leads in an hermetic joint, an organic plastic sheath substantially surrounding said electrical device, said organic plastic sheath selected from the group consisting of thermosetting plastic resins and thermoplastic resins and an inner non-fusible metal layer disposed on said organic plastic sheath and bonded thereto having a margin embracing said metallized ring of said insulative body, said inner non-fusible metal layer selected from the group consisting of gold, silver, copper, zinc, iron, nickel, cobalt and alloys thereof, said inner metallic layer having a thickness of about 0.1 to 10 mils, an outer fusible metal layer disposed on said inner non-fusible metal layer and having a margin embracing said metallized ring of said insulative body, said outer fusible metal layer selected from the group consisting of the alloys of lead, bismuth, tin, cadmium and indium, said outer metallic layer having a thickness of about 0.05 to 2 mils, said outer fusible metal layer having wetted said inner non-fusible metal layer and having bridged gaps between said inner non-fusible metal layer and said metallized ring thereby providing an hermetically sealed enclosure.

References Cited

UNITED STATES PATENTS

| | | | |
|---|---|---|---|
| 2,862,155 | 11/1958 | Bubriski | 317—230 |
| 3,124,728 | 3/1964 | Ruben | 317—230 |
| 3,248,618 | 4/1966 | Szpak et al. | 317—230 |
| 3,343,047 | 9/1967 | Comado et al. | 317—230 |

JAMES D. KALLAM, *Primary Examiner.*

U.S. Cl. X.R.

174—52; 317—260